(12) United States Patent
Gunawardena et al.

(10) Patent No.: US 8,886,731 B2
(45) Date of Patent: Nov. 11, 2014

(54) DECENTRALIZED RELAYING ALGORITHM FOR MOBILE DEVICES

(75) Inventors: Dinan Gunawardena, Cambridge (GB); Thomas Karagiannis, Cambridge (GB); Alexandre Proutiere, Lidingö (SE); Milan Vojnovic, Cambridge (GB)

(73) Assignee: Microsoft Corporation, Redmond, WA (US)

(*) Notice: Subject to any disclaimer, the term of this patent is extended or adjusted under 35 U.S.C. 154(b) by 230 days.

(21) Appl. No.: 13/150,535

(22) Filed: Jun. 1, 2011

(65) Prior Publication Data

US 2012/0309358 A1 Dec. 6, 2012

(51) Int. Cl.
*G06F 15/16* (2006.01)
*H04W 88/04* (2009.01)

(52) U.S. Cl.
CPC .................................. *H04W 88/04* (2013.01)
USPC ........... 709/206; 709/238; 370/231; 370/235; 370/312

(58) Field of Classification Search
USPC .......... 709/206, 203, 238; 370/231, 235, 312; 455/412.1
See application file for complete search history.

(56) References Cited

U.S. PATENT DOCUMENTS

| | | | |
|---|---|---|---|
| 7,852,764 B2* | 12/2010 | Yamaguchi et al. ........... | 370/231 |
| 2008/0151802 A1 | 6/2008 | Sheu et al. | |
| 2009/0029645 A1* | 1/2009 | Leroudier ........................ | 455/7 |
| 2009/0190514 A1 | 7/2009 | Yi et al. | |
| 2010/0057563 A1* | 3/2010 | Rauber et al. ............... | 705/14.53 |
| 2010/0165846 A1* | 7/2010 | Yamaguchi et al. .......... | 370/236 |
| 2010/0260088 A1* | 10/2010 | Jeon .............................. | 370/312 |

OTHER PUBLICATIONS

Balasubramanian, et al., "Enhancing Interactive Web Applications in Hybrid Networks", retrieved on Jan. 27, 2011 at <<http://www.cs.umass.edu/~arun/papers/thedu.pdf>>, ACM, Proceedings of Intl Conference on Mobile Computing and Networking (MobiCom), San Francisco, California, Sep. 2008, pp. 70-80.

Balasubramanian, et al., "Interactive WiFi Connectivity for Moving Vehicles", retrieved on Jan. 27, 2011 at <<http://www.cs.umass.edu/~arun/papers/ViFi.pdf, ACM SIGCOMM, Conference on Data Communication, Seattle, Washington, Aug. 2008, pp. 427-438.

(Continued)

*Primary Examiner* — Frantz Jean
(74) *Attorney, Agent, or Firm* — Steve Wight; Judy Yee; Micky Minhas

(57) ABSTRACT

A decentralized relaying algorithm for mobile devices is described. In an embodiment, a mobile device acts as a relay within a network of mobile devices and on contact with a source device downloads messages from the source according to a locally stored relaying probability for each channel of information within the network. These messages are subsequently downloaded to another device which is the end user of the message. Where the relay does not download the message from the source as a result of the decision made based on the relaying probability, a virtual message is downloaded which comprises metadata only and not the payload of the message. The relay updates the stored relaying probabilities for each channel based on locally observable information which includes feedback received from mobile devices to which the relay has downloaded messages. The feedback identifies unique paths for the payload of messages through the network.

20 Claims, 10 Drawing Sheets

(56) References Cited

OTHER PUBLICATIONS

Balasubramanian, et al., "Replication Routing in DTNs: A Resource Allocation Approach", retrieved on Jan. 27, 2011 at http://www.cs.umass.edu/~arun/papers/RAPID-ToN.pdf>>, IEEE/ACM Transactions on Networking (TON), vol. 18, No. 2, Apr. 2010, pp. 596-609.

"BT/FON, The Wi-Fi community built by you", retrieved on Jul. 6, 2011 at http://www.btfon.com/>>, FON Wireless Ltd./British Telecommunications PLC., 2007, pp. 1.

Burgess, et al., "MaxProp: Routing for Vehicle-Based Disruption-Tolerant Networks", retrieved on Jan. 27, 2011 at <<http://ieeexplore.ieee.org/stamp/stamp.jsp?tp=&arnumber=4146881>>, IEEE, Proceeding of INFOCOM, Apr. 2006, pp. 1-11.

Burns, et al., "MORA Routing and Capacity Building in Disruption-Tolerant Networks", retrieved on Jan. 27, 2011 at <<http://prisms.cs.umass.edu/brian/pubs/bburns.adhoc_nets_jrnl.pdf>>, Elsevier Science Publishers, Ad Hoc Networks, vol. 6, No. 4, Jun. 2008, pp. 600-620.

Cao, "Perturbation analysis of discrete event systems: Concepts, algorithms, and applications", Elsevier, European Journal of Operational Research, vol. 91, No. 1, May 1996, pp. 1-13.

Costa, et al., "Socially-Aware Routing for Publish-Subscribe in Delay-Tolerant Mobile Ad Hoc Networks", retrieved on Jan. 27, 2011 at <<http://ieeexplore.ieee.org/stamp/stamp.jsp?tp=&arnumber=4530732>>, IEEE Journal on Selected Areas in Communications, vol. 26, No. 5, Jun. 2008, pp. 748-760.

Davis, et al., "Wearable Computers as Packet Transport Mechanisms in Highly-Partitioned Ad-Hoc Networks", retrieved on Jan. 27, 2011 at <<http://ieeexplore.ieee.org/stamp/stamp.jsp?tp=&arnumber=962117>>, IEEE Computer Society, Proceedings of Intl Symposium on Wearable Computers (ISWC), 2001, pp. 141-148.

Fitchard, "AT&T doubles 3G cell capacity but still faces backhaul challenges", retrieved on Jul. 6, 2011 at <<http://connectedplanetonline.com/3g4g/news/att-doubles-3g-010510/>>, Penton Media Inc., Connected Planet, Jan. 5, 2010, pp. 1-3.

Gunawardena, et al., "Characterizing Podcast Services: Publishing, Usage, and Dissemination", ACM SIGCOMM, Proceedings of Internet Measurement Conference (IMC), Chicago, Illinois, Nov. 2009, pp. 209-222.

Jain, et al., "Routing in a Delay Tolerant Network", retrieved on Jan. 27, 2011 at <<http://conferences.sigcomm.org/sigcomm/2004/papers/p299-jain111111.pdf>>, ACM SIGCOMM, Portland, Oregon, 2004, pp. 1-13.

Karlsson, et al., "Delay-Tolerant Broadcasting", retrieved on Jan. 27, 2011 at http://ieeexplore.ieee.org/stamp/stamp.jsp?arnumber=04114800>>, IEEE Transactions on Broadcasting, vol. 53, No. 1, Mar. 2007, pp. 369-381.

Krifa, et al., "Optimal Buffer Management Policies for Delay Tolerant Networks", retrieved on Jan. 27, 2011 at <<http://ieeexplore.ieee.org/stamp/stamp.jsp?tp=&arnumber=4557763>>, IEEE, Proceedings of SECON, 2008, pp. 260-268.

Lenders, et al., "Wireless Ad Hoc Podcasting", retrieved on Jan. 27, 2011 at <<http://ieeexplore.ieee.org/stamp/stamp.jsp?tp=&arnumber=4292839>>, IEEE, Proceedings of SECON, 2007, pp. 273-283.

Lindemann, et al., "Modeling Epidemic Information Dissemination on Mobile Devices with Finite Buffers", retrieved on Jan. 27, 2011 at <<http://rvs.informatik.uni-leipzig.de/de/publikationen/papers/SIGMETRICS05.pdf>>, ACM Sigmetrics, Proceedings of Intl Conference on Measurement and Modeling of Computer Systems, 2005, pp. 121-132.

Lindgren, et al., "Poster: Probabilistic Routing in Intermittently Connected Networks", retrieved on Jan. 27, 2011 at <<http://citeseerx.ist.psu.edu/viewdoc/download;jsessionid=ED884880CD487F408827ABA6F587032?doi=10.1.1.14.2195&rep=rep1&type=pdf>>, ACM, Intl Symposium on Mobile Ad Hoc Networking and Computing (MobiHoc), 2003, 2 pages.

Liu, "Cross-Layer Design of Multi-Hop Wireless Networks", retrieved on Jan. 27, 2011 at <<http://www.commsp.ee.ic.ac.uk/~chiliu/PhD.Thesis.Harold.Cross-Layer%20Design.2010.pdf>>, PhD Dissertation, Imperial College, London, Feb. 2010, pp. 1-166.

McNett, et al., "Access and Mobility of Wireless PDA Users", retrieved on Jan. 27, 2011 at <<http://www.sysnet.ucsd.edu/wtd/wtd.pdf>>, Department of Computer Science and Engineering, University of California, San Diego, Technical Report CS2004-0780, Feb. 2004, pp. 1-12.

Nelson, et al., "Encounter-Based Routing in DTNs", retrieved on Jan. 27, 2011 at <<http://mobius.cs.uiuc.edu/~snelso20/infocom09.pdf>>, IEEE, Proceedings of INFOCOM, 2009, pp. 846-854.

Pabst, et al., "Relay-Based Deployment Concepts for Wireless and Mobile Broadband Radio", retrieved on Feb. 1, 2010 at <<http://www.stanford.edu/class/ee360/suppRead/readl/Relay_based.pdf>>, IEEE Communications Magazine, Wireless World Research Forum, Sep. 2004, pp. 80-89.

Piorkowski, et al., "A Parsimonious Model of Mobile Partitioned Networks with Clustering", retrieved on Jan. 27, 2011 at <<http://lcawww.epfl.ch/nsarafij/publications/comsnets09.pdf>>, Intl Communication Systems and Networks Workshops (COMSNETS), Bangalore, India, Jan. 2009, pp. 1-10.

Reich, et al., "The Age of Impatience: Optimal Replication Schemes for Opportunistic Network", retrieved on Jan. 27, 2011 at <<http://www.thlab.net/tr/CR-PRL-2009-06-0001.pdf>>, ACM, Proceedings of Allerton Conference on Communication, Control, and Computing (CoNext), 2009, pp. 85-96 (also Thomson Technical Report CR-PRL-2009-06-0001, Jun. 30, 2009, pp. 1-32).

Spyropoulos, et al., "Spray and Wait: An Efficient Routing Scheme for Intermittently Connected Mobile Networks", retrieved on Jan. 27, 2011 at <<http://conferences.sigcomm.org/sigcomm/2005/paper-SpyPso.pdf>>, ACM SIGCOMM, Workshop on Delay-tolerant Networking (WDTN), Philadelphia, PA, Aug. 2005, pp. 1-8.

The Mobile Internet Report, retrieved on Jan. 27, 2011 at <<http://www.morganstanley.com/institutional/techresearch/pdfs/mobile_internet_report.pdf>>, Morgan Stanley Research, Dec. 15, 2009, pp. 1-424.

Wang, et al., "Adaptive Randomized Epidemic Routing for Disruption Tolerant Networks", retrieved on Jan. 27, 2011 at <<http://ieeexplore.ieee.org/stamp/stamp.jsp?arnumber=05401503>>, IEEE Computer Society, Intl Conference on Mobile Ad-hoc and Sensor Networks, 2009, pp. 424-429.

Zhang, et al., "Delay/disruption tolerant mobile ad hoc networks: latest developments", John Wiley and Sons, Wireless Communications and Mobile Computing, vol. 7, No. 10, 2007, pp. 1219-1232.

Zhang, "Routing in Intermittently Connected Mobile Ad Hoc Networks amd Delay Tolerant Networks: Overview and Challenges", retrieved on Jan. 27, 2011 at <<http://ieeexplore.ieee.org/stamp/stamp.jsp?tp=&arnumber=4116780&userType=inst>>, IEEE Communications Surveys and Tutorials, vol. 8, No. 1, 2006, pp. 24-37.

\* cited by examiner

US 8,886,731 B2

DECENTRALIZED RELAYING ALGORITHM FOR MOBILE DEVICES

BACKGROUND

The data communication demands of mobile devices are increasing, particularly with the development of rich multimedia applications which run on such devices. Although a mobile device may have sporadic access to high-speed WiFi connections, often when the device is not particularly mobile (e.g. when in the home, workplace or a hotspot), the rest of the time the data transfer rates to the device are limited by the cellular network (e.g. the 3G network) or other wireless access network infrastructure. Data transfer over this infrastructure is often capped by the subscription data plans offered by a service provider and multimedia applications can easily reach the limited monthly caps. In addition (or instead) the charging structure applied by a service provider can mean that high data usage is very expensive. These mechanisms (caps and/or charging schedules) which artificially constrain data transfer demands may be used by service providers because the backhaul capacity of their network would otherwise be insufficient to meet user demands.

A technique which has been proposed to increase capacity is to use devices in the network, which may be user devices or dedicated devices, to act as relays for data. A relay receives data from one nearby device and transmits the data to another nearby device.

The embodiments described below are not limited to implementations which solve any or all of the disadvantages of known relaying methods and systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present a selection of concepts disclosed herein in a simplified form as a prelude to the more detailed description that is presented later.

A decentralized relaying algorithm for mobile devices is described. In an embodiment, a mobile device acts as a relay within a network of mobile devices and on contact with a source device downloads messages from the source according to a locally stored relaying probability for each channel of information within the network. These messages are subsequently downloaded to another device which is the end user of the message. Where the relay does not download the message from the source as a result of the decision made based on the relaying probability, a virtual message is downloaded which comprises metadata only and not the payload of the message. The relay updates the stored relaying probabilities for each channel based on locally observable information which includes feedback received from mobile devices to which the relay has downloaded messages. The feedback identifies unique paths for the payload of messages through the network.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
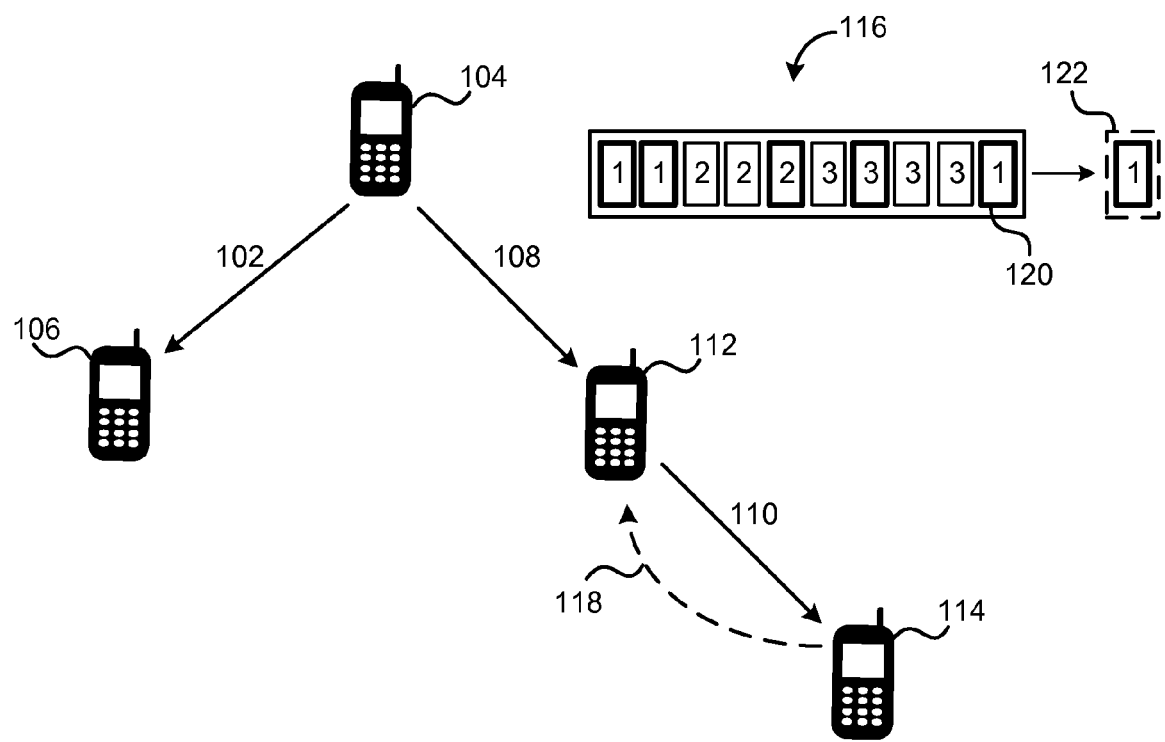
FIG. 1 is a schematic diagram of a system of mobile devices which supports delivery of data by device to device transfer.

FIG. 1 is a schematic diagram of a system (or network) of mobile devices which supports delivery of data by device to device transfer either in a single hop 102 from a source (mobile device 104) to a user (mobile device 106) or in two hops 108, 110 from the source to a relay (mobile device 112) and then from the relay to a user (mobile device 114). The system operates a decentralized and opportunistic relaying algorithm which only relies upon local observations, i.e. it does not rely upon a central controlling entity to instruct devices which messages (or packets) to download or forward. Relaying probabilities (which may also be referred to as 'control parameters') stored at a relay are used on a per message basis to make a decision whether to relay the packet or not. By adapting these relaying probabilities based on feedback received at that relay from users, a defined global system objective is optimized and the algorithm allows for general user mobility (and does not require any independence assumptions with regard to message forwarding paths).

Although FIG. 1 shows the source as a mobile device (mobile device 104), the term 'source' is used herein to refer to any device which provides content and may be a mobile or a fixed device (e.g. any non-mobile communications device). The terms 'relay' and 'user' are used herein to refer to mobile devices and it is appreciated that a single mobile device may act as any combination of source, relay and/or user for different messages within the system and in some examples a mobile device may be both a relay and a user for the same message. The mobile devices in the system may be any mobile communications device, including but not limited to, mobile telephones, smart phones, laptop or tablet computers, gaming consoles, electronic book readers, dedicated relay devices (e.g. located on a vehicle), etc. Each mobile device which acts as a relay is assumed to have a finite buffer 116 which is available for relaying data and this buffer operates a buffer management policy to allow the download of a new message when the buffer (which may be of a fixed size) is full. In an example, a First-In-First-Out (FIFO) policy may be used and in addition the policy may further specify that expired or out-of-date-messages are not downloaded. In other examples, different buffer management policies may be used. Where FIFO is used, the FIFO policy may be based on age, such that the oldest message is discarded first, or may be based on which messages have been downloaded, with the message that was least recently downloaded from a source being discarded first. Different devices may have different sized buffers and in some examples, the buffer size of a particular device may not be fixed but may vary (e.g. based on the available capacity of any memory element in the device which may be shared with locally used data or applications, or based on a cost function). In the following description the terms 'packet' and 'message' are used interchangeably.

Within the system there are one or more information channels, i, and messages (or packets) associated with a particular channel may be published by a single source or by multiple sources. Where multiple sources publish packets from the same channel, each packet has a unique identifier so that duplication can be detected by a relay or user (which may also be referred to as a receiver). For the purpose of the following description, the usefulness (or interest) of a packet to a user depends on whether the user subscribes to the particular channel or not (where a channel may, for example, be a news feed, a social media feed, etc) and whether the packet is delivered to the user in a timely manner, e.g. within a deadline $t_i$ associated with messages of channel i (i.e. a message published at time t may be of interest to a user if it reaches the user no later than $t+t_i$) and this time $t_i$ may also be referred to as the 'expiry time' of a message. Once time $t+t_i$ has been reached for a message, that message may be referred to as expired or out-of-date. The value of $t_i$ may be the same for all users or may be specified by a user. The deadlines may be different for different channels or may be the same for all channels. It will be appreciated that other criteria may be used in addition to, or instead of, subscription and timeliness to determine the usefulness of a packet to a user.

The steady-state probability $p_{i,u}(x)$ that a message of channel i is received within the deadline by user u under a relaying strategy x may be defined as:

$$p_{i,u}(x) = P_x[A_{i,u} \le t_i]$$

where $P_x[.]$ is the steady-state probability distribution of random variables under relaying strategy x and $A_{i,u}$ is the age of a message of channel i when received by user u (assumed infinite if the message is never received by the user). In a stationary and ergodic regime, $p_{i,u}(x)$ corresponds to the delivery rate of channel-i messages to user u (counting only messages received within deadline $t_i$) over an asymptotically large number of published messages.

The value of channel i to user u may be defined by $V_{u,i}(p_{i,u}(x))$, where $V_{i,u}$ is an increasing function $V_{u,i}:[0;1] \to R$ (where R is the set of real numbers). This definition captures both intrinsic user interest for the content of given channel and its timeliness of delivery. Special cases include linear functions such that $V_{u,i}(p_{i,u}(x)) = w_{u,i} \cdot p_{i,u}(x)$ where $w_{i,u}$ is a positive constant that captures user u's intrinsic preference for channel i. For example, $w_{i,u}$ may take binary values, value 1 if user u subscribes to channel i, and value 0 otherwise. User's preference for a channel can also be inferred from the observed rate of consumption of the content of this channel.

The global system objective of a system, such as shown in FIG. 1, is to optimize aggregate value of information channels across users in the system:

System $$\text{maximize} \sum_{i \in I, u \in U} V_{i,u}(p_{i,u}(x)) \quad (1)$$

$$\text{over } x \in [0, 1]^{|I| \times |U|}$$

where I is the set of all channels and U is the set of all users.

The above optimization problem accounts for buffer constraints at individual user devices, which are implicit in the definition of the delivery probability $p_{i,u}(x)$. However, there is no cost for relays to download messages from sources or to transmit these messages to interested users. In some examples, relays may wish to limit the number of transmissions, for example to save battery power. In order to include this, the objective function in (1) may be replaced by:

$$\sum_{i \in I, u \in U} V_{i,u}(p_{i,u}(x)) - \sum_{r \in U} C_r(a_r(x)) \quad (2)$$

where $C_r(a_r)$ is a cost function which captures the cost for relay r to transmit and receive messages to be relayed at an average transmission and reception rate $a_r(x)$ under strategy x. This cost function may, in some examples, be assumed to be increasing, continuously differentiable, and convex. In the following analysis, the global objective (1) is used for purposes of explanation only and the relaying strategies proposed may be extended to include transmission costs (as in the objective function (2)).

Relaying strategies are described that aim at solving SYSTEM, introduced in (1) using a sub-gradient method that amounts to updating the relay probabilities $x_{i,r}$ as follows, for every channel i and relay r, $$\frac{d}{dt} x_{i,r} = \sum_{j \in I, u \in U} V'_{j,u}(p_{j,u}(x)) \frac{\partial}{\partial x_{i,r}} p_{j,u}(x) \quad (3)$$

Under this dynamics, the objective function in SYSTEM increases over time and converges to a maximum value.

In order to evaluate the gradient in (3), i.e. for every channel j and user u, it is necessary to evaluate $\delta p_{j,u}(x)/\delta x_{i,r}$, for every channel i and relay r. To simplify this computation, techniques from Smoothed Perturbation Analysis (SPA) and stochastic approximation may be used. In the following analysis, the linear utility function $V_{u,i}(p_{i,u}(x)) = w_{u,i} \cdot p_{i,u}(x)$ (where $w_{i,u}$ is a positive constant) is also used by way of example, but the analysis can be extended to more general classes of utility functions.

Use of SPA to evaluate the gradient of the function $p_{j,u}(x)$, for every channel i and relay r, yields an explicit characterization of the gradient in terms of expectations of some random variables whose realizations can be locally observed by users and estimated by an online procedure described below.

The age $A_{j,u}$ of a message of channel j when received by user u, if received at all, exceeds the deadline $t_j$ for user u, if the message could not have been received within deadline by user u through neither a direct contact with a source of the message nor via any relay. The age $\tilde{A}_{j,r,u}$ of the message of channel j at earliest time instant at which it could have been received by user u through relay r (if it was downloaded by relay r) is only less than $t_j$ (assuming that the message was generated at time i=0) if both of the following two conditions hold true: (1) there exists a path to user u through relay r within deadline $t_j$ and (2) the message is not evicted by the buffer policy at relay r. This may be written:

$$\{\tilde{A}_{j,r,u} \leq t_j\} = \{D_{j,r,u} \leq t_j\} \cap \{N_{j,r,u} \leq B_r\}$$

where $N_{j,r,u}$ denotes the number of messages admitted by relay r in the time interval $(D_{j,r}, D_{j,r,u}]$, where is the one-hop delay from j to relay r and $D_{j,r,u}$ is the two-hop delay from j to u through relay r and $B_r$ is the size of the buffer at relay r. The parameter $\tilde{A}_{j,r,u}$ is defined for each message of channel j and may have a finite value even if the message was not downloaded by relay r. To account for this:

$$A_{j,r,u} = \begin{cases} \tilde{A}_{j,r,u} & R_j = 1 \\ \infty & R_j \neq 1 \end{cases}$$

where $R_{j,r}$ is a binary indicator that takes value 1 if the message was admitted by relay r and value 0, otherwise.

From this it can be observed that $A_{j,u} > t_j$ holds if and only if (1) the message could not have been delivered through a direct contact of user u with a source, i.e. $D_{j,u} > t_j$, and (2) there exists no path to deliver the message through a relay within the deadline, i.e. $A_{j,r,u} > t_j$, for every relay r. In other words:

$$\{A_{j,u} > t_j\} = \{D_{j,u} > t_j\} \cap_r \{A_{j,r,u} > t_j\}$$

Some additional notation is now defined: $N_{j,r,u}^i$ is the number of channel-i messages downloaded by relay r in the time interval $(D_{j,r}, D_{j,r,u}]$ and $K_{j,r,u}^i$ is the number of channel-i messages that are observed by relay r in $(D_{j,r}, D_{j,r,u}]$ but not downloaded. $A_{j,u}^{-r}$ denotes the age of a message of channel j when arriving at user u, assuming that relay r is not used to disseminate the message. $A_{j,u}^{-r} > t_j$ holds if and only if $D_{j,u} > t_j$ and $A_{j,r',u} > t_j$, for every relay $r' \neq r$. An indicator $I_{j,r,u}$ is also defined for a message of channel j, relay r, and user u:

$$I_{j,r,u} = 1 I_{A_{j,u}^{-r} > t_j} 1 I_{D_{j,r,u} \leq t_j}.$$

where, for a relation A, $1I_A$ is equal to 1 if A is true and 0 otherwise.

Using this notation, for every channel $j \in I$ and user $u \in U$, the gradient of the function $p_{j,u}(x)$ is given by, for every channel i and relay r, $$\frac{\partial}{\partial x_{i,r}} p_{j,u}(x) = I E_x \left[ 1 I_{A_{i,u}^{-r} > t_i} 1 I_{A_{i,r,u} \leq t_i} \right] 1 I_{j=i} - \qquad (4)$$

$$I E_x [I_{j,r,u} R_{j,r} (N_{j,r,u}^i 1 I_{N_{j,r,u} = B_r} + K_{j,r,u}^i 1 I_{N_{j,r,u} = B_r - 1})].$$

The component of the gradient, $\delta p_{j,u}(x)/\delta x_{i,r}$, consists of a positive and a negative element. The positive element is zero for every $i \neq j$ and for $i = j$, it corresponds to the probability that the message of channel i could have been delivered through relay r and not through any other path. The negative element can be interpreted as a negative externality term that captures the effect of increasing the relaying probability $x_{i,r}$ on the probability of delivery of channel-j messages. This term measures the number of channel-i messages downloaded by relay r during the time the channel-j message, which was dropped by r just before meeting user u, was in the buffer of relay r; and the number of channel-i messages that were rejected by relay r during the time the channel-j message was in the buffer and it was at the head of the queue (next to be evicted) when relay r meets user u. The gradient in (4) can be estimated in an online fashion by relays using only locally observable information, as described below. The term 'locally observable' is used herein to refer to information which is available at a node (e.g. at a relay) and which may either be computed/observed at the node or provided to the node by another node (e.g. by a user or a source) which computed/observed the information. This is distinct from methods and systems which require full information about the state of the network and the messages carried in that network.

In order to update the relaying probabilities by a relay r based on locally observable information, the following variables may be introduced per message m of channel c that are locally observable by relay r:

$$Y_{i,r}(m) = \sum_{u \in U} (\alpha_{i,r,u}(m) - \beta_{i,r,u}(m))$$

where $$\alpha_{i,r,u}(m) = (w_{i,u} 1 I_{A_{i,r}^{-r}(m) > t_{i,u}} 1_{\tilde{A}_{i,u}(m) \leq t_{i,u}}) 1 I_{c=i}$$

and $$\beta_{i,r,u}(m) = w_{c,u} 1 I_{A_{c,u}^{-r}(m) > t_{c,u}} 1 I_{D_{c,r,u}(m) \leq t_{c,u}} R_{c,r}(m) \times$$

$$\times [N_{c,r,u}^i(m) 1 I_{N_{c,r,u}(m) = B_r} + K_{c,r,u}^i(m) 1 I_{N_{c,r,u}(m) = B_r - 1}].$$

The variables $\alpha_{i,r,u}(m)$ and $\beta_{i,r,u}(m)$ correspond to the positive and negative elements described above in the discussion following equation (4).

A relay r can observe $Y_{i,r}(m)$ when it receives feedback from users for message m (as indicated by arrow 118 in FIG. 1). Each user u interested in messages m informs relay r whether other relays were able to successfully deliver message m to user u. This may be achieved by letting each user u interested in message m keep a record whether message m could have been received within deadline through a unique path, if it could have been received at all. Then, when for the first time $T_{r,u}(m)$ after the deadline of message m expires, relay r and user u meet, user u sends the information to r which allows the relay to compute the part of $Y_{i,r}(m)$ corresponding to user u. For purposes of explanation, it is assumed that relay r updates the relaying probability $x_{i,r}$ at instances $T_{r,u}(m)$, for each message m and interested user u by an online update rule described below.

The $n^{th}$ feedback from a user to relay r may be denoted $S_r(n)$ (and noting that $(S_r(n), n \geq 0)$ is a superposition of the instances $(T_{r,u}(m), \forall m, \forall u))$. The channel of the corresponding message may be denoted c(n), and the user from which relay r receives feedback denoted u(n). The relaying probabilities ($x_{i,r}$; $i \in I$) may then be updated using the following stochastic approximation algorithm per each new feedback received, for $0 < \epsilon < 1$, $$x_{i,r}(n+1) = x_{i,r}(n) + \epsilon \frac{\sum_{j \in I} \lambda_j^r}{\lambda_{c(n)}^r} (\alpha_{i,r,u(n)}(n) - \beta_{i,r,u(n)}(n)) \qquad (5)$$

where $\lambda_j^r$ is the publishing rate of messages of channel j as observed by relay r (and this is equal to the publishing rate of channel j messages if the relay meets a source of channel j at a positive rate). It can be seen that the update rule (5) conveniently aggregates feedback from different users in an online fashion. It can also be shown that the update rule (5) approximates the sub-gradient algorithm specified in (3).

Example implementations of systems, such as shown in FIG. 1, which use the update rule (5) are now described. It will be appreciated that some of the implementations described below may implement only some aspects of the update rule (5) or may implement a variation of that rule. Furthermore, as described above, the rule may be updated as required to incorporate a transmission cost element.

Figure 2:
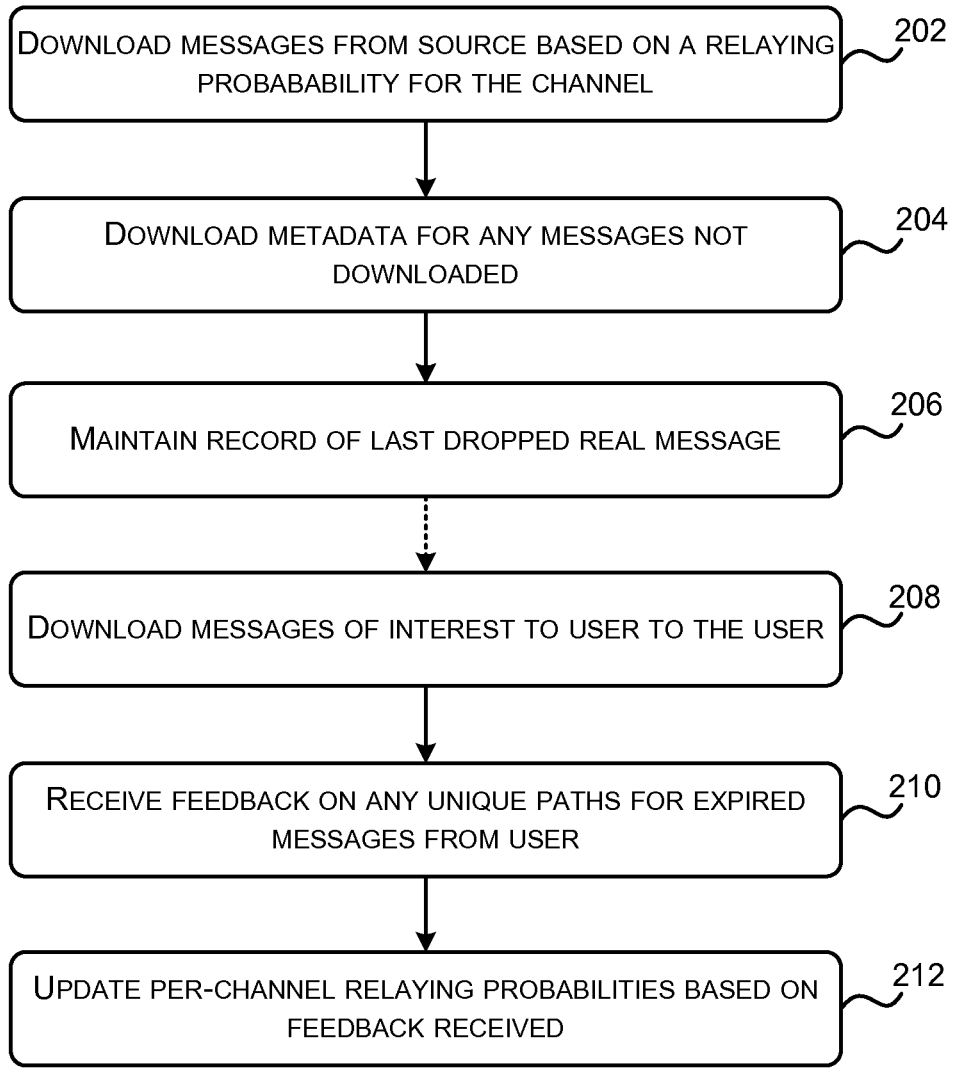
FIG. 2 shows a flow diagram of a first example of a method of operation of a relay within a system such as that shown in FIG. 1.

FIG. 2 shows a first example of a method of operation of a relay (e.g. mobile device 112) within a system such as that shown in FIG. 1. When the relay makes contact with a source, the relay downloads each non-expired message from the source based on a relaying probability (which may also be referred to as a probability factor) for the particular channel to which the message belongs (block 202). As described above, messages which have already expired will not be considered for downloading. Using the notation above, the relaying probability $x_{i,r}$ is used by relay r in determining whether to download a message from channel i and it will be appreciated that different relays are likely to have different relaying probabilities for the same channel, i. The decision is made by the relay on a per-message basis and in some examples the messages may be downloaded in decreasing order of age (i.e. oldest message downloaded first).

Where the relay does not download a message (based on the decision made using the relaying probability), the relay downloads some metadata associated with the message (block 204) and this metadata may be referred to as a 'virtual message' to distinguish it from a 'real message' where the actual message content (which may also be referred to as the message payload) is downloaded. This metadata, which may comprise control information, is used in the computation of the positive and negative elements when updating the relaying probability (e.g. using equation (5) above). The metadata comprises a subset of the message (or packet) header and the size of the metadata is significantly smaller than the data payload of the message. As a minimum, this metadata identifies the message (e.g. by a unique identifier) and the channel to which it belongs. The downloaded messages (whether real or virtual) are stored in the buffer 116 of the relay (as shown in FIG. 1).

When downloading messages from a source (in block 202), it may be necessary to drop existing (real or virtual) messages which are stored in the buffer. As described above, the buffer operates a FIFO system which may be based on message age or how long ago the message was downloaded from a source. The relay maintains a record of the last dropped real message (block 206) and this is updated each time another real message is dropped. This is shown graphically in FIG. 1, where the buffer 116 comprises a sequence of real messages (indicated by the thicker line around the message rectangle 120) and virtual messages (which do not consume buffer space for payload data, such that the buffer capacity may be considered to be defined in terms of the number of real messages it can store). In FIG. 1, the number within a real/virtual message rectangle indicates the channel to which the message belongs. The last dropped message record 122 is also shown and in the example shown, this is a real message from channel 1.

When the relay makes contact with a user, the relay downloads messages to the user which are of interest to that user (block 208). As described, whether a message is of interest to a user may be defined in terms of whether the user has subscribed to the particular channel and whether the message has expired (i.e. whether the message is delivered to the user within a time interval $t_1$ after the message was published). Virtual messages are downloaded as well as real messages as these virtual messages are used by the user when identifying unique paths for messages through the system to that user.

The relay also receives feedback from the user (block 210) for expired messages. This feedback identifies any messages which were observed at the relay (i.e. downloaded from the relay) within the deadline and where the payload of this message could not be downloaded from neither a source nor another relay—this therefore identifies unique paths for real messages from a source, via the particular relay, to the user and therefore may be referred to as 'positive feedback'. The feedback also identifies any messages which were of interest to the user, which were observed at the relay in either the head-of-the-queue position (e.g. in the position of message 120 in FIG. 1) or last-dropped state (e.g. within record 122 in FIG. 1) within the deadline and where the payload of this message could not be downloaded from neither a source nor another relay (i.e. the path is a unique path for a real message). This feedback may be referred to as 'negative feedback' as it indicates that the relay is downloading too many messages (i.e. the relaying probabilities are too high) with the end result that messages traveling over unique paths are either being lost (they are observed a last-dropped state) or are nearly being lost (they are observed in the head-of-the-queue position). Having received some feedback from a user, the relay updates the stored per-channel relaying probabilities based on the feedback received (block 212).

Although FIG. 2 shows a relay making contact with a source (when blocks 202-206 are performed) and subsequently making contact with a user (when blocks 208-212 are performed), this is by way of example only. It will be appreciated that due to the mobile nature of the relays, sources and users within the system, there is no correlation between when a relay meets a source and when a relay meets a user. For example, a relay may meet a source and then may meet a sequence of users or a relay may meet a number of sources before making contact with any users. Where a relay meets the same user twice without meeting a source in between, a situation may arise where there are no new messages that are of interest to the user and which are therefore downloaded to the user (in block 208).

Figure 3:
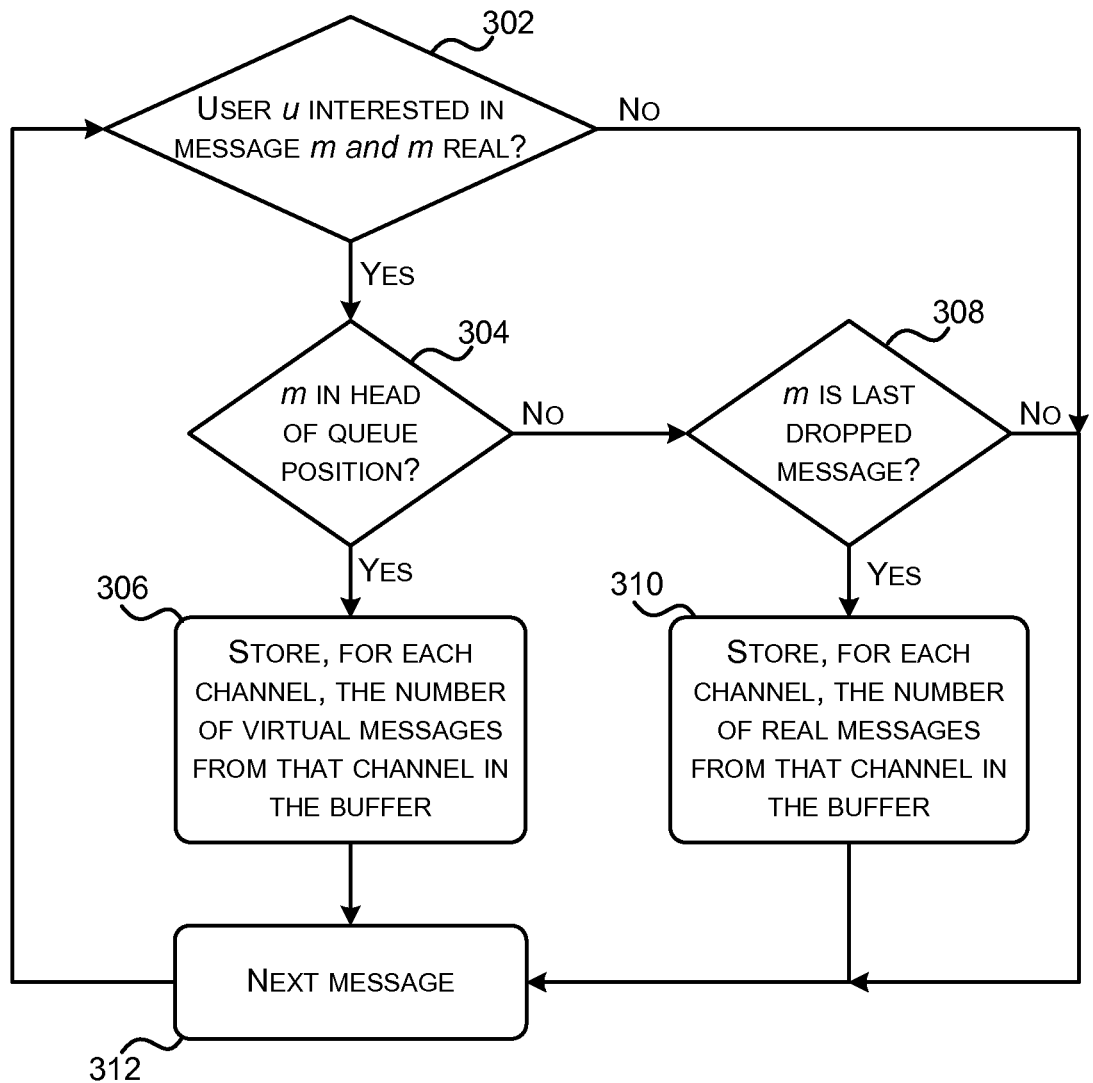
FIG. 3 is a flow diagram of an example method of collecting state information for use in updating relaying probabilities.

In addition to storing relaying probabilities for each channel and details of the last-dropped message, a relay may store additional state information or parameters which may be used in updating the relaying probabilities (in block 212). As shown in FIG. 3, when a relay is in contact with a user, a set of records are created for a real message if the user is interested in the message ('Yes' in block 302) and if the message is in either the head-of-the-queue position ('Yes' in block 304) or was the last-dropped message ('Yes' in block 308). If none of these three conditions are met ('No' in block 302 or 'No' in both blocks 304 and 308) then records are not stored and the relay may consider the next message (block 312). In this method, only real messages are considered as only real messages can be in the head-of-the-queue position or be the last-dropped message.

If a message of interest ('Yes' in block 302) is in the head-of-the-queue position ('Yes' in block 304), values (which may be denoted dec_h[m][i][u] or dec_h[m][i]) are stored for each channel i (i.e. not only the channel to which message m belongs) which are set to the difference between the number of channel-i messages in the buffer (both real and virtual) and the number of real channel-i messages in its buffer (block 306). This is actually equal to the number of virtual channel-i messages in the buffer at the time of the event (i.e. at the time that user u observes message m in the head-of-the-queue state), $K_{c,r,u}^{i}(m)$ (where c is the channel of message m). In the example shown in FIG. 1, if user 114 is interested in the message in the head-of-the-queue position (as indicated by rectangle 120), the following records are created:

$K_{l,r,u}^1(m)=0$ $K_{l,r,u}^2(m)=2$ $K_{l,r,u}^3(m)=3$

As in the state shown, there are no virtual messages from channel 1 (i=1) in the buffer 116, two virtual messages from channel 2 and three virtual messages from channel 3.

If a message of interest ('Yes' in block 302) is in the last-dropped record 122 ('Yes' in block 308), values (which may be denoted dec_ld[m][i][u] or dec_d[m][i]) are stored for each channel i (i.e. not only the channel to which message m belongs) which are set to the number of real channel-i messages in its buffer (block 310) at the time of the event (i.e. at the time that user u observes message m in the last-dropped record), $N_{c,r,u}^i(m)$ (where c is the channel of message m). In the example shown in FIG. 1, if user 114 is interested in the message in the last-dropped record 112, the following records are created:

$N_{l,r,u}^1(m)=3$ $N_{l,r,u}^2(m)=1$ $K_{l,r,u}^3(m)=1$

As in the state shown, there are three real messages from channel 1 (i=1) in the buffer 116, and one real message from each of channel 2 and channel 3.

Figure 4:
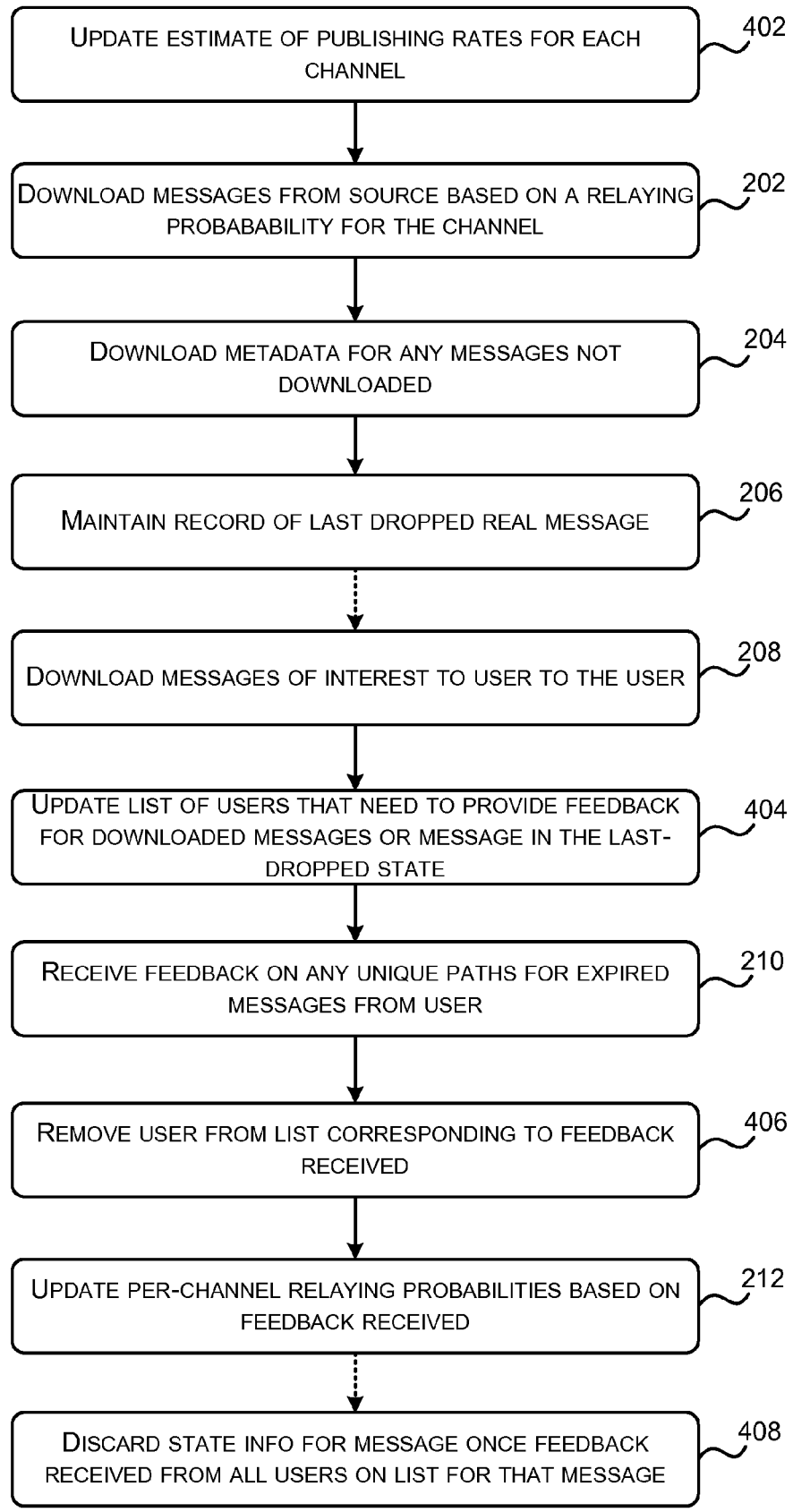
FIG. 4 shows a flow diagram of a second example of a method of operation of a relay within a system such as that shown in FIG. 1.

The relay may also store and use estimates of the publishing rate of messages of each channel ($\lambda_r^c$) when updated the relaying probabilities. As shown in FIG. 4, when the relay is in contact with a source, these estimates are updated (block 402) and this may be done using a recursive estimator such as exponential weighting smoothing. Any suitable method of estimating publishing rate may be used. In one example, the relay may observe the number of new published messages between successive encounters with a source of a given channel. In another example, the relay may observe the number of non-expired messages that are currently available from the source.

In an example implementation, the feedback for a message m of channel c provided by a user u (and received by a relay in block 210) may be in the form of ternary feedback ($f_1(m)$, $f_2(m)$, $f_3(m)$), where $f_1(m)$, $f_2(m)$ and $f_3(m)$ are binary values. In an example, these binary values may be used to adjust the relaying probabilities as follows, for a fixed configuration parameter $\epsilon>0$:

$x_{i,r} \leftarrow x_{i,r} + \epsilon \hat{\lambda}_c^r [f_1(m)1_{c=i} - f_2(m)(f_3(m)dec\_h[m][i][u] + (1-f_3(m))dec\_ld[m][i][u])]$.

In this example, $f_1(m)$ signals whether an increment of the relaying probability $x_{c,r}$ should be made, $f_2(m)$ signals whether a decrement of the relaying probabilities of relay r should be made, and $f_3(m)$ signals whether the decrement is because m was either in the head-of-the-queue or the last-dropped state.

In an optimization to this method implemented at a relay, the relay may maintain a list of users that need to provide feedback for each message m. Such a list comprises those users that observed message m from the buffer of relay r or in the last-dropped state at relay r (as created/updated in block 404). Users are only added to the list when they observe message m for the first time, i.e. they are not added to the list again if they subsequently view the same message again. The list of users is updated (in block 406) when feedback is received (in block 210) from a user for message m and any state maintained for message m can be deleted by relay r (in block 408) when feedback is received from all users that needed to provide feedback (i.e. from all users on the list). The state that is deleted comprises the parameters dec_h[m][i][u] and/or dec_ld[m][i][u] for all channels where such records have been generated (e.g. in blocks 306 and 310 of FIG. 3) and any metadata associated with the message that may be stored.

In another optimization of the methods shown in FIGS. 2 and 4, the relay may also record details of the last message downloaded from a source and this may be recorded on a per-channel basis (e.g. last message downloaded from channel i, last message downloaded from channel i+1 . . . ). This information may subsequently be used when the relay is next in contact with that source (or with other sources) such that the relay can only look for and download messages which are newer than the last message downloaded.

The following pseudo-code shows another example implementation of the relaying algorithm at a relay r.

```
foreach new contact to a node e do
    if e is a source then
        foreach new packet p from e do
            c'=channel of packet p;
            λ←rate_estim(λ,c')
            Draw a sample U ~ Unif[0,1];
            if queue length==B & U≤x(c') then
                Add packet p to the tail of queue;
                while head is a virtual packet do
                    discard head
                end
                discard last_drop;
                last_drop←head;
            else
                append packet p as a virtual packet to the tail of the queue;
            end
    end
    if e is a user then
    foreach packet p of interest to e do
        if p is at the head of the queue then
            foreach channel c of packets in the queue do
                dec_h[p][c]=que_len_all(c) - que_len(c)
            end
        if p is the last dropped packet then
            foreach channel c of packets in the queue do
                dec_d[p][c]= que_len(c)
            end
        end
    foreach feedback for packet p received from e do
        (f[1], f[2], f[3])=feedback received from e;
        foreach c do
            y[c]=0;
        end
        if f[2]>0 then
        foreach c do
            if f[3] then
                y[c]=-f[2]dec_h[p][c]
            else
                y[c]=-f[2]dec_d[p][c]
            end
        end
        c'=channel of packet p;
        y[c']=y[c']+f[1]
        x=update_relay_prob(x,y)
    end
end
Procedure update_relay_prob(x,y)
foreach c do
    x[c] ←x[c]+εy[c]/λ[c];
    if x[c]<0 then x[c]=0;
    if x[c]>1 then x[c]=1
end
return x
Procedure queue_len(c)
return the number of real packets of channel c that are in queue
Procedure queue_len_all(c)
return the number of packets (real and virtual) of channel c that are in queue
```

As described above, each relay maintains historical data about all messages irrespective of whether they downloaded them from a source or whether they did not. For messages which are not downloaded, this data comprises metadata (downloaded in block 204) and for messages which are downloaded, this data comprises the messages themselves. In addition, the historical data includes details of messages which were in the last-dropped state or head-of-the-queue state at a particular encounter with a user (in blocks 206, 306 and 310). This record of all messages which could have traversed a particular path through the network, irrespective of whether the payload of the message actually traversed the network, enables unique paths through the network to be identified and the data relating to messages in the head-of-the-queue position or last-dropped state provides an indication of whether the relays are becoming overloaded with messages from a particular channel. Together this information enables the global system objective to be optimized in a fully distributed manner. It will, however, be appreciated, that the particular data recorded in the examples described above, provides just one example of suitable historical data which may be recorded in order to enable the global system objective to be optimized in this distributed manner and based only on locally observable data. In other examples, different data may be stored by the relay (e.g. instead of the data stored in blocks 306 and 310) and this different data may be used in updating the per-channel relaying probabilities.

As described above, a single control variable, the relaying probability, is used to determine whether the relay downloads a message from a source or not. This single control variable is the same for all messages of the channel (or stream) and is only updated when feedback is received regarding an expired message from a user. Use of a single control variable results in a system which can be implemented practically and is scalable to large numbers of mobile devices and large systems of mobile devices. Experimental results show that the use of such a single control variable, compared to a centralized system, does not impact performance.

Figure 5:
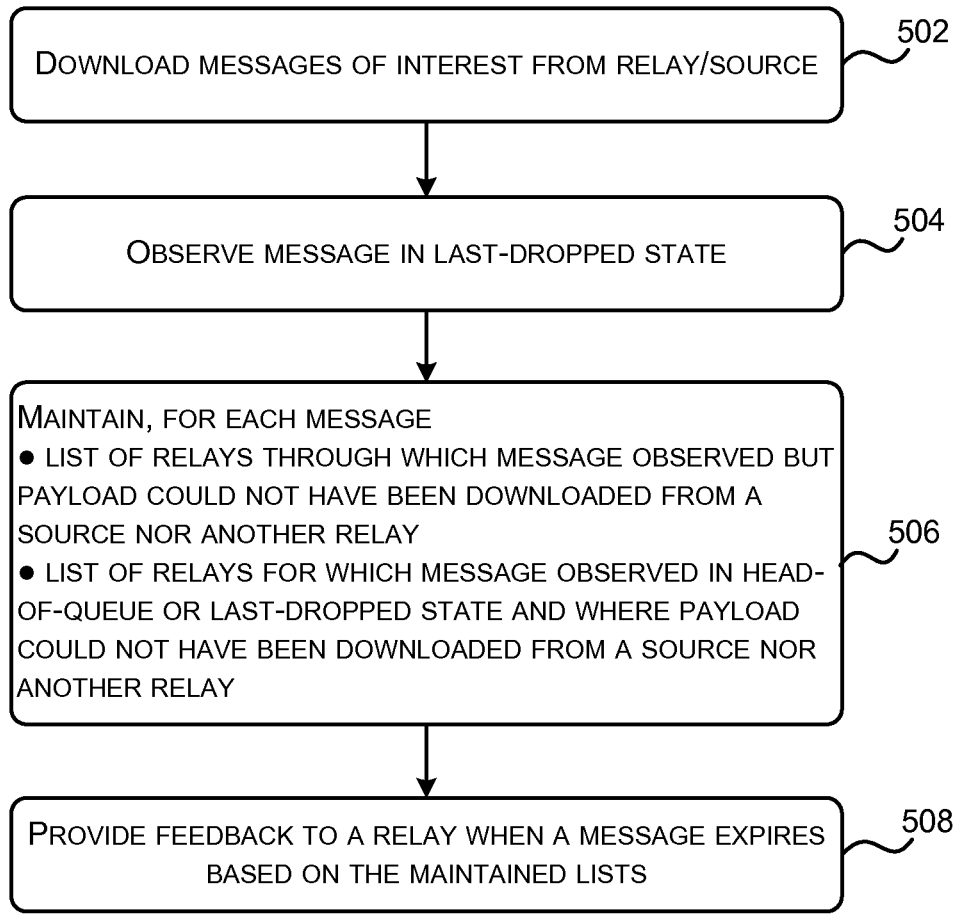
FIGS. 5-9 show example of a methods of operation of a user within a system such as that shown in FIG. 1.

FIG. 5 shows a first example of a method of operation of a user (e.g. mobile device 114) within a system such as that shown in FIG. 1. When a user is in contact (which may also be described as 'meeting') a relay or source, the user downloads messages of interest from the relay or source (block 502). Where the user downloads messages from a source, all the messages will be real messages; however where the user downloads messages from a relay, some of the messages will be real messages and some messages will be virtual messages. The user also observes the message that is in the last-dropped state (e.g. within record 122 in FIG. 1) at the relay (block 504). This information is then used by the user to maintain, for each message observed (i.e. downloaded or seen in the last-dropped state) two lists of relays (block 506), either or both of which may be empty. A first list (which may be denoted inc_list[m]) identifies those relays through which the message was observed but where the payload of this message could not be downloaded from neither a source nor another relay—this therefore identifies unique paths for real messages from a source, via the listed relay, to the particular user. A second list (which may be denoted dec_list[m]) identifies those relays through which a message was observed in either a head-of-the-queue position (e.g. in the position of message 120 in FIG. 1) or last-dropped state (e.g. within record 122 in FIG. 1) and where the payload of this message could not be downloaded from neither a source nor another relay. These two lists are then used to provide feedback to relays when they are next in contact with the relay after the expiry of a particular message (block 508).

In order to assist in maintaining these lists, the user may also maintain a Boolean variable for each observed message which can be used to distinguish the case where a user could have downloaded the payload of a message from more than one device, be that device a source or a relay. In an example, this parameter, which may be denoted seen_real[m] may be set to 0 when a real version of message m has not been observed and may be updated to be equal to 1 when a real version of the message m is downloaded.

Figure 6:
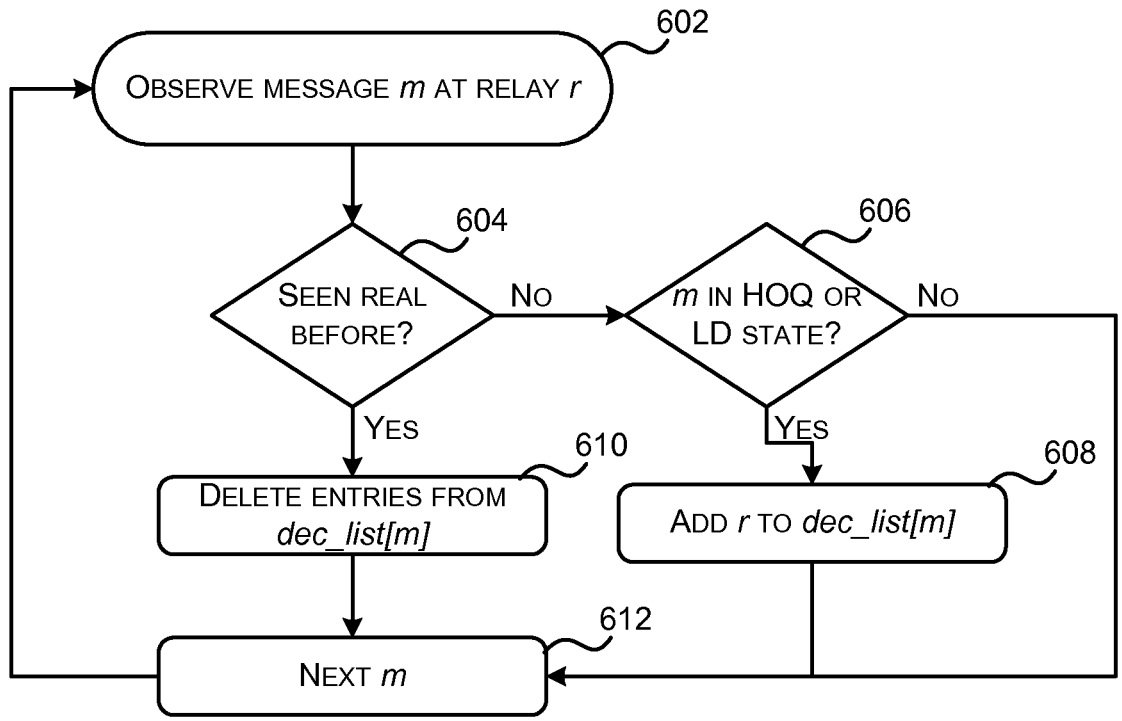

FIG. 6 is a flow diagram of an example method of updating the second of the two lists described above, dec_list[m], i.e. those relays through which a message was observed in either a head-of-the-queue position (HOQ) or last-dropped (LD) state and where the payload of this message could not be downloaded from neither a source nor another relay. When a message m is observed at relay r (block 602), if a real version has not been seen before ('No' in block 604), i.e. message m has not been downloaded earlier (e.g. as indicated if the variable seen_real[m] is equal to 0), then, if message m is either in the head-of-the-queue position or last-dropped state at relay r ('Yes' in block 606), r is appended to dec_list[m] (block 608). Otherwise, if a real version of message m has been seen (and therefore downloaded) before (e.g. as indicated if seen_real[m] is equal to 1), then any entries from dec_list[m] are deleted because there existed a path to deliver message m to user u (block 610). The process is then repeated for the next message which is observed at the relay (block 612).

Figure 7:
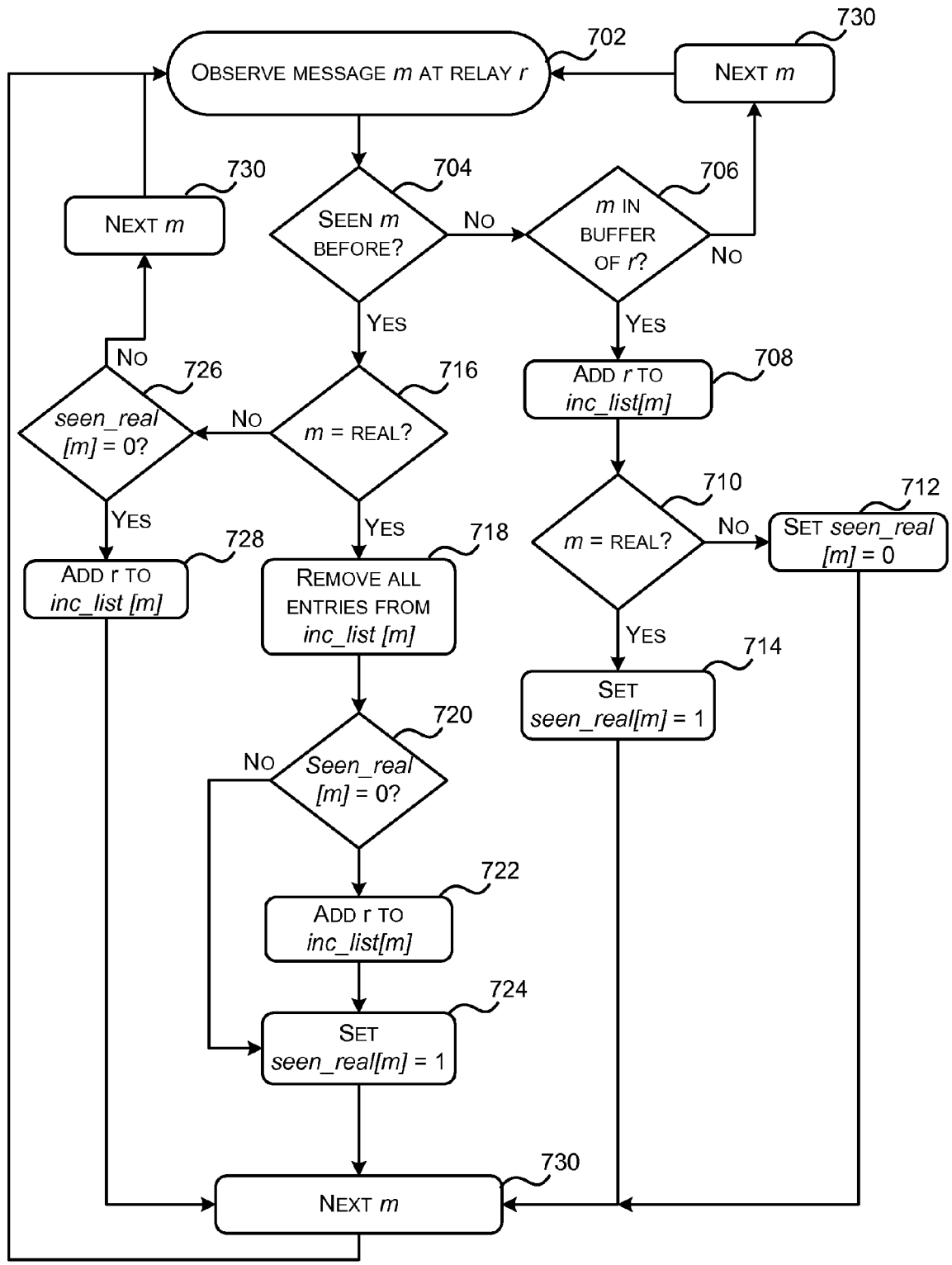

FIG. 7 is a flow diagram of an example method of updating the first of the two lists described above, inc_list[m], i.e. those relays through which message m was observed and where the payload of this message could not be downloaded from neither a source nor another relay. When a message m is observed at a relay (block 702), if the message m is observed for the first time by user u ('Yes' in block 704) and is in the buffer of relay r ('Yes' in block 706, i.e. it is not in the last-dropped state), inc_list[m] is initialized to r (block 708) and seen_real[m] is set to 0, if m is a virtual message ('Yes' in block 710 followed by block 712), and set to 1, otherwise ('No' in block 710 followed by block 714).

Otherwise, if message m was already observed at an earlier instance ('Yes' in block 704), then two cases are distinguished. First, if message m is a real message ('Yes' in block 716), then any entries from inc_list[m] are removed (block 718) and r is appended (in block 722), if seen_real [m] is equal to 0 ('Yes' in block 720); then, seen_real [m] is set to 1 (block 724). Second, if m is a virtual message ('No' in block 716), r is appended to inc_list[m] (in block 728), if seen_real[m] is equal to 0 ('Yes' in block 726). This process is repeated for the next message which is observed at the relay r (block 730).

Although the methods for updating the two lists (dec_list [m] and inc_list[m]) are shown separately in FIGS. 6 and 7, it will be appreciated that both methods are performed when a message is observed at a relay and the methods may be performed in parallel or sequentially (in either order).

Figure 8:
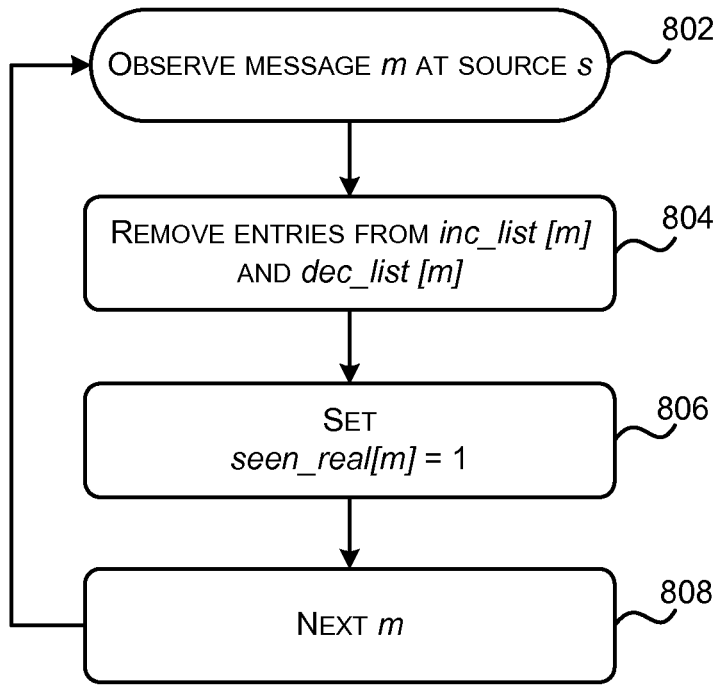

When a user u meets a source s, the two lists described above and the value of the variable seen_real[m] are also updated, as shown in FIG. 8. If message m is observed from source s within deadline (block 802), then any entries are removed from both inc_list[m] and dec_list[m] (block 804), and seen_real[m] is set to 1 (block 806). This is because if a user observes a message m at a source, any path through a relay r cannot be unique and all messages observed at the source include the payload and are hence considered real messages (and not virtual messages). This process is repeated for the next message observed at the source (block 808).

Figure 9:
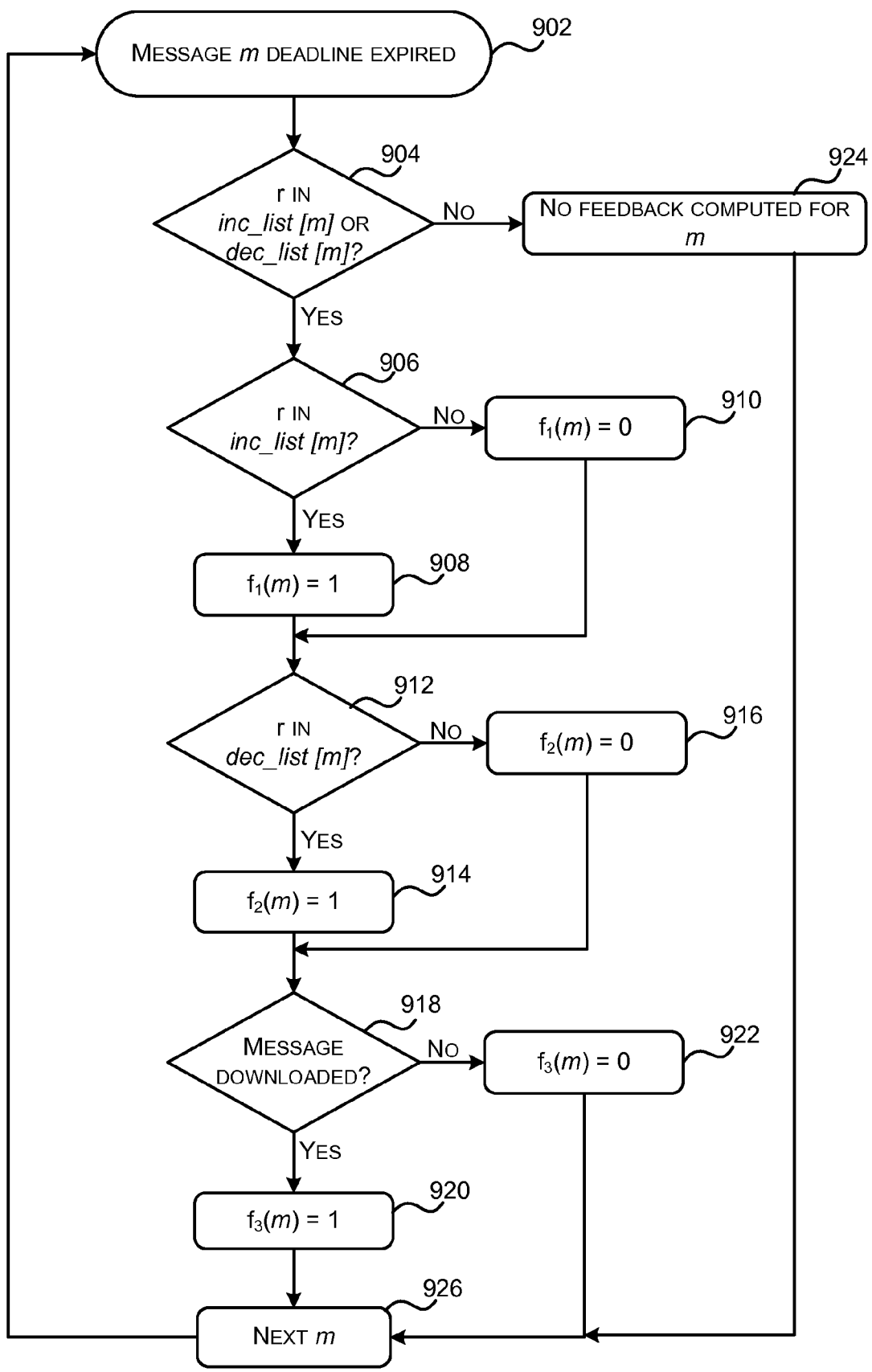

FIG. 9 shows a flow diagram of an example method of computing feedback based on the two lists (as generated in block 506 of FIG. 5 and shown in more detail in FIGS. 6-8). For each message m such that there exists an entry r in either inc_list[m] or dec_list[m] and the deadline of message m has expired (block 902 and 'Yes' in block 904), the feedback is set as follows. If r is in inc_list[m] ('Yes' in block 906), then $f_1(m)=1$ (block 908), otherwise, $f_1(m)=0$ ('No' in block 906 followed by block 910). If r is in dec_list[m] ('Yes' in block 912) then $f_2(m)=1$ (block 914), otherwise $f_2(m)=0$ ('No' in block 912 followed by block 916). If user u has downloaded message m ('Yes' in block 918), then $f_3(m)=1$ (block 920), otherwise $f_3(m)=0$ ('No' in block 918 followed by block 922). It can be seen that conditional on $f_2(m)=1$, $f_3(m)=1$ means that message m was in the head-of-the-queue state when r and u were in contact, and otherwise, if $f_3(m)=0$, message m was in the last-dropped state. The computed feedback ($f_1(m); f_2(m); f_3(m)$) can then be communicated to relay r when they are next in contact (block 508 of FIG. 5).

The following pseudo-code shows another example implementation of the methods implemented at user u and described above with reference to FIGS. 5-9.

```
foreach packet p observed (in the queue or in last_drop position) from
relay r do
    if deadline of packet p expired then exit;
    if u not interested in channel of p then exit;
    if p has been observed earlier by u then s = seen_real [p];
    if packet p is observed for the first time and in queue of r then
        inc_list [p] = {r};
        seen_real [p] = 0;
        if p is a real packet then seen_real [p] = 1
    else
        if p is a real packet then
            delete all entries in inc_list [p];
            if seen_real [p] == 0 then append r to inc_list [p];
            seen_real [p] = 1
        else
            if seen_real [p] == 0 then append r to inc_list [p];
        end
    end
    if s == 0 then
        if p is either last dropped or at the head of queue then append
            r to dec_list [p]
    else
        delete all entries in dec_list [p]
    end
end
foreach p such that (there exists r in inc_list [p] or dec_list [p]) and
deadline of p expired do
    f = (0,0,0);
    if r in inc_list then f[1] = 1
    if r in dec_list then f[2] = 1
    if has payload of p then f[3] = 1
    Send f to r
end
```

As described above, the relaying strategies proposed may be extended to include transmission costs (as in the objective function (2) above). In an example implementation, the gradient with cost functions (which corresponds to equation (4) in the example above) consists of two components:

$$\frac{\partial}{\partial x_{i,r}} F(x) = \sum_{j \in I, u \in U} V'_{j,u}(p_{j,u}(x)) \frac{\partial}{\partial x_{i,r}} p_{j,u}(x) - \sum_{g \in U} C'_g(a_g(x)) \frac{\partial}{\partial x_{i,r}} a_g(x)$$

The first component is identical to that described above and so the same update rules for the relaying probabilities apply for this component and the other component (which relates to the second term in equation (2)) involves computation of $\partial a_g(x)/\partial x_{i,r}$ for every relay g, relay r and channel i. The communication rate $a_g(x)$ for a relay is a sum of the download rate $d_g(x)$ and upload rate $a_g(x)$. It can be shown that:

$$\frac{\partial}{\partial x_{i,r}} d_g(x) = \lambda_i 1_{g=r}$$

$$\frac{\partial}{\partial x_{i,r}} u_g(x) = \sum_{j \in I, u \in U} \lambda_j \frac{\partial}{\partial x_{i,r}} IE_x \left[ 1_{A_{j,g,u} \leq A^{-g}_{j,u} \wedge t_j} \right]$$

And based on this, update rules for the second component may be derived which are similar but different to those for the first component.

Experimental results using the implementations of the algorithm described above (with ε=0.01, although other values were tried resulting in negligible performance changes), show that the algorithm provides similar or better performance than other relaying schemes which are much more complex because they require full information about the state of the network and the messages carried in that network (e.g. which messages are held by which nodes). In situations of low publishing rates, the algorithm described above performs best and outperforms existing relaying schemes. As described above, the algorithms described herein are fully decentralized, require only local observations and allow for general user mobility. It has also been proven that the algorithm converges to optimal points of the underlying global system objective. Results have also shown that the algorithm is more robust than existing relaying schemes whose principles are based on specific user mobility assumptions such as statistical independence of delays through different paths (an assumption which is often invalid).

Furthermore, the methods described above support multi-point to multi-point communications unlike existing techniques which are limited to unicast routing between a source and a user (which may be referred to as an 'end device'). Point to multi-point routing (i.e. multi-channel multicasting) is supported by the definition of an objective function (and hence by the relaying probability update algorithm and feedback mechanism) that encodes the value of a channel transmission as an aggregate delivery rate across users interested in this channel. The multi-point to multi-point capability is enabled by the fact that for the system described herein it does not matter whether there is a unique source of a channel or there are multiple distributed sources for the same channel (as described above).

The algorithm described above is a distributed algorithm in which a relay updates relaying probabilities based on user expressed interest in packets that they relay is carrying when the user meets the relay. The use of virtual messages, as described above, provides a mechanism that enables the algorithm to estimate the needed parameters to converge to optimal relaying probabilities.

In an example implementation, the algorithms and methods described above may be implemented in an application which runs on the mobile device or may be implemented within the operating system of the mobile device. Where the algorithm is implemented as an algorithm, this may be downloadable to the mobile device from a central location on the request of the person using the mobile device or the application may be pushed to the mobile device by a network operator. A single application may enable a mobile device to act as a relay and a user (i.e. an end user of the messages) or separate applications may enable operation as a user and as a relay.

Figure 10:
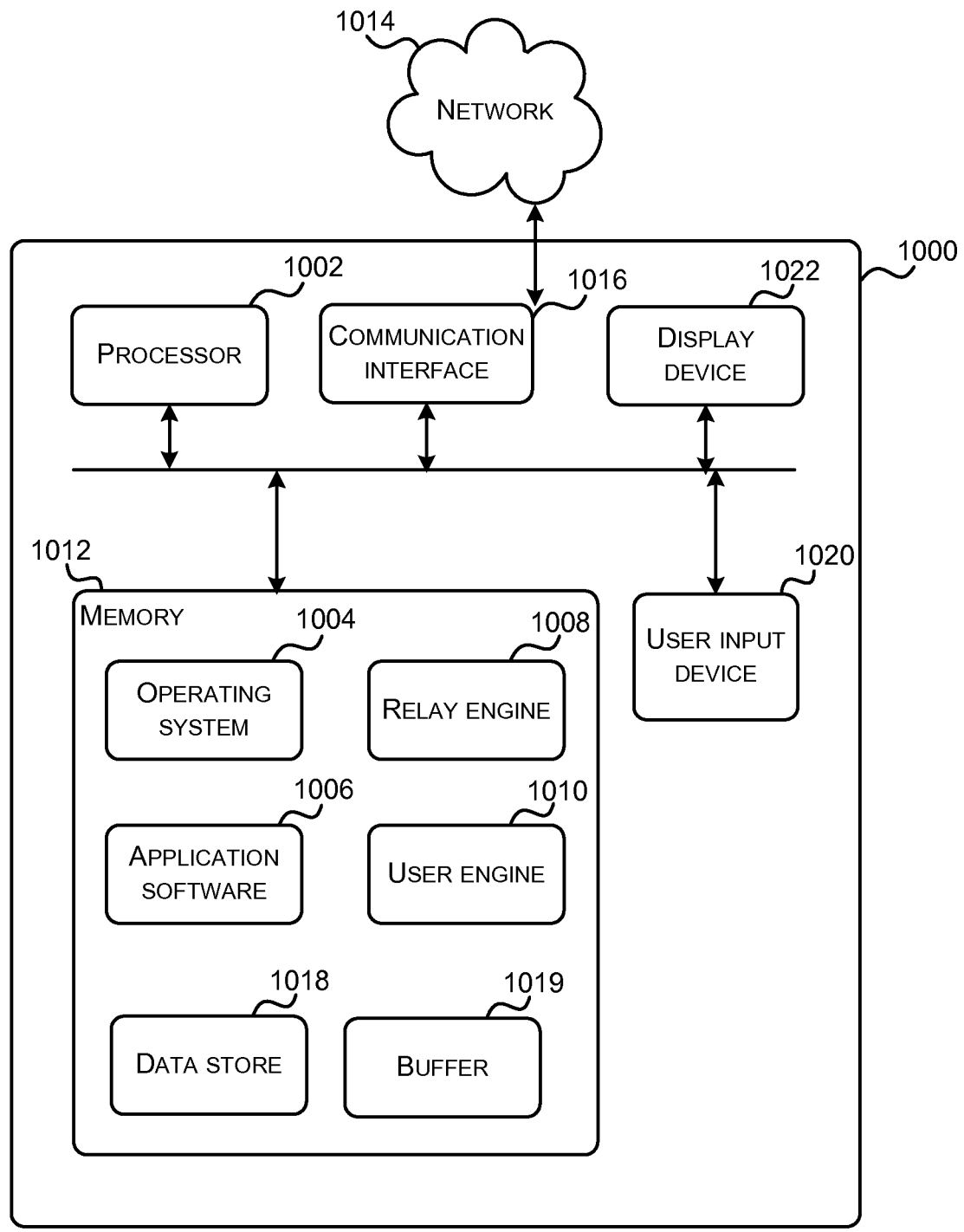
FIG. 10 illustrates an exemplary computing-based device in which embodiments of the relaying algorithms described herein may be implemented.

FIG. 10 illustrates various components of an exemplary computing-based device 1000 which may be implemented as any form of a computing and/or electronic device, and in which embodiments of the methods described above may be implemented. In particular, computing-based device 1000 may comprise a mobile device within a system (e.g. as shown in FIG. 1) which implements at least a subset of the methods described above and acts as a source, relay and/or user.

Computing-based device 1000 comprises one or more processors 1002 which may be microprocessors, controllers or any other suitable type of processors for processing computer executable instructions to control the operation of the device in order to send and/or receive messages and in some examples to act as a relay for messages downloaded from a source. In some examples, for example where a system on a chip architecture is used, the processors 1002 may include one or more fixed function blocks (also referred to as accelerators) which implement a part of the relaying algorithm in hardware (rather than software or firmware). In an example, the algorithm for updating the per-channel relaying probabilities may be implemented in hardware.

Platform software comprising an operating system 1004 or any other suitable platform software may be provided at the computing-based device to enable application software 1006 to be executed on the device. The application software may comprise a relay engine 1008 and/or a user engine 1010. The relay engine 1008 is arranged to operate as described above (e.g. with reference to FIGS. 2-4) and to implement an algorithm to update the per-channel relaying probabilities based on feedback received from users. The user engine 1010 is arranged to operate as described above (e.g. with reference to FIGS. 5-9) and provide feedback to relays on unique paths through the system.

The computer executable instructions may be provided using any computer-readable media that is accessible by computing based device 1000. Computer-readable media may include, for example, computer storage media such as memory 1012 and communications media. Computer storage media, such as memory 1012, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (memory 1012) is shown within the computing-based device 1000 it will be appreciated that the storage may be distributed or located remotely and accessed via a network 1014 or other communication link (e.g. a link to another mobile device) using communication interface 1016.

The computer-readable media 1012 may also comprise a data store 1018 which is used to store data created by or used by the relay engine 1008 or user engine 1010. In an example, the data store 1018 may store the relaying probabilities, the historical data about messages which have been observed at a source and the record sets relating to messages in the buffer at the time a user observes a message that is of interest to that user and which is in the head-of-the-queue position or last-dropped state (e.g. the record sets created in blocks 306 and 310 of FIG. 3). Where the computing-based device 100 is operating as a relay, the computer-readable media 1012 further comprises a buffer 1019 for storing real and virtual downloaded messages.

The communication interface 1016 enables the computing-based device 1000 to receive messages from other devices and to transmit messages to other devices. Any suitable radio protocol may be used for this communication, including cellular protocols, short range protocols, etc. The communication interface 1016 may be arranged such that it can transmit/receive using more than one radio protocol or there may be more than one communication interface 1016 within the device 1000. In a system, such as shown in FIG. 1, a single protocol may be used (e.g. a cellular protocol) to communicate between devices and with the wider network, or alternatively multiple protocols may be used. In an example, cellular protocols may be used to communicate with the wider network and shorter range protocols may be used for device to device transfer of messages (e.g. as described above).

The computing-based device 1000 also comprises a user input device 1020 and a display device 1022. In some instances these two devices may be combined into a single device, such as a touch sensitive display. In other examples, a separate keyboard or set of buttons may be provided (in addition to or instead of a touch sensitive display) as a user input device 1020. The display device 1022 may provide a graphical user interface.

Although the present examples are described and illustrated herein as being implemented in a system as shown in FIG. 1, the system described is provided as an example and not a limitation. As those skilled in the art will appreciate, the present examples are suitable for application in a variety of different types of systems comprising mobile devices of any type (and any combination of such devices).

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method of operation of a first mobile device, the method comprising:
   on contact with a source of messages from an information channel, downloading messages from the source according to a stored relaying probability for the information channel and storing a virtual message for any messages not downloaded, the virtual message comprising metadata associated with the message;
   on contact with a second mobile device, transmitting messages from the first mobile device to the second mobile device; and
   updating stored relaying probabilities for each information channel based on locally observable information.

2. A method according to claim 1, wherein the first mobile device forms part of a network of mobile devices and the locally observable information comprises feedback received from the second mobile device and other mobile devices in the network.

3. A method according to claim 2, wherein the feedback received at the first mobile device from another mobile device identifies unique paths through the network from a source of a message to said another mobile device.

4. A method according to claim 1, wherein the virtual message does not comprise payload data for the message.

5. A method according to claim 1, wherein the first mobile device comprises a finite buffer arranged to store the downloaded messages and virtual messages and wherein each message has an associated expiry time, the method further comprising:
   receiving feedback from the second mobile device relating to any unique paths for expired messages previously transmitted to the second mobile device; and
   wherein updating stored relaying probabilities for each information channel based on locally observable information comprises updating stored relaying probabilities for each information channel based on the feedback received.

6. A method according to claim 5, further comprising: dropping messages from the buffer when full according to a first-in-first-out policy and maintaining a record of a last dropped message from the buffer.

7. A method according to claim 6, further comprising, on contact with the second mobile device:
   determining if a first message stored in the buffer and of interest to the second mobile device is in a head-of-the-queue position, and if the first message is in the head-of-the-queue position, storing, for each channel, a number of virtual messages from that channel stored in the buffer;
   determining if the first message stored in the buffer and of interest to the second mobile device is in a last-dropped state, and if the first message is in the last-dropped state, storing, for each channel, a number of downloaded messages from that channel stored in the buffer; and
   repeating the determining and storing steps for a next message stored in the buffer,
   and wherein the stored numbers of virtual messages and downloaded messages for each channel and associated with the first message are used in updating the stored relaying probabilities based on the feedback received for the first message.

8. A method according to claim 7, wherein the feedback received for a message comprises three parameters, a first parameter signals whether an increment in relaying probabilities should be made, a second parameter signals whether a decrement in relaying probabilities should be made and a third parameter indicates whether any decrement is because the message was in a head-of-the-queue position or a last-dropped state.

9. A method according to claim 8, further comprising, on contact with the source of messages from an information channel, updating a stored publishing rate for the information channel.

10. A method according to claim 9, wherein the stored relaying probabilities are updated using:

$$x_{i,r} \leftarrow x_{i,r} + \epsilon \hat{\lambda}_c^r [f_1(m) 1_{c=i} - f_2(m)(f_3(m) dec\_h[m][i][u] + (1-f_3(m)) dec\_ld[m][i][u])],$$

wherein:
   $x_{i,r}$ is the stored relaying probability for information channel i and relay r, ε is a fixed configuration parameter;
$\lambda_i^r$ is the stored publishing rate for information channel i;
$f_1(m), f_2(m)$ and $f_3(m)$ are the first, second and third parameters in the feedback received for a message m;
dec_h[m][i][u] is the stored number of virtual messages from channel i stored in the buffer on contact with the second mobile device; and
dec_ld[m][i][u] is the stored number of downloaded messages from channel i stored in the buffer on contact with the second mobile device.

11. A method according to claim 6, further comprising:
for each message transmitted to the second mobile device and for the last dropped message, adding the second mobile device to a list of users from which feedback is expected for the message;
when feedback is received for a message from the second mobile device, removing the second mobile device from the list of users for that message; and
discarding stored information for a message when feedback has been received from all devices on the list of users for that message.

12. A method according to claim 5, wherein the messages transmitted to the second mobile device comprises a subset of the messages stored in the buffer, the subset of messages comprising non-expired messages from information channels to which the second mobile device has subscribed.

13. A method according to claim 1, wherein the second mobile device comprises an end user for each of the messages transmitted from the first mobile device to the second mobile device.

14. A method of operation of a mobile device, the method comprising:
on contact with a mobile device operating as a relay for messages and comprising a finite buffer:
downloading a subset of messages from the buffer, the subset of messages comprising messages which have not exceeded a defined expiry time for the message and which belong to an information channel to which a second mobile device has subscribed and the subset comprising at least one real message comprising a data payload and at least one virtual message comprising metadata and no data payload; and
observing a message in a last-dropped state at the first mobile device;
for each downloaded or observed message, maintaining details of unique paths from a source of the message to the mobile device via a single mobile device acting as a relay; and
providing feedback to mobile devices operating as relays relating to the unique paths.

15. A method according to claim 14, wherein maintaining details of unique paths from a source of the message to the mobile device comprises:
maintaining a first list of relays through which the message was observed but where the payload could not have been downloaded from another relay or from a source of the message; and
maintaining a second list of relays through which the message was observed in the last-dropped state or downloaded from a head-of-the-queue position in the buffer and where the payload could not have been downloaded from another relay or from a source of the message.

16. A method according to claim 15, further comprising, on contact with a source of a message, removing all entries from the first and second lists associated with the message.

17. A method according to claim 15, wherein the feedback is provided in relation to a message after the defined expiry time for the message and based on the first and second lists associated with the message.

18. A method according to claim 17, wherein feedback to a relay based on an entry for a message in the first list comprises positive feedback and feedback to a relay based on an entry for a message in the second list comprises negative feedback.

19. One or more device-readable media, the device-readable media including hardware, with device-executable instructions that, when executed by a mobile computing device comprising a finite buffer, direct the mobile computing device to perform steps comprising:
on contact with a source of messages from an information channel:
download messages from the source into the buffer, each message having an associated expiry time and being downloaded according to a stored relaying probability for the information channel; and
store a virtual message in the buffer for each message not downloaded according to the stored relaying probability for the information channel, the virtual message comprising metadata associated with the message; and
on contact with a second mobile device:
transmit a subset of the messages stored in the buffer to the second mobile device, the subset of messages comprising non-expired messages from information channels to which the second mobile device has subscribed;
receive feedback from the second mobile device relating to any unique paths for expired messages previously transmitted to the second mobile device; and
update stored relaying probabilities for each information channel based on the feedback received.

20. One or more device-readable media according to claim 19, further comprising device-executable instructions that, when executed by the mobile computing device direct the mobile computing device to perform steps comprising:
on contact with a mobile device operating as a relay for messages and comprising a finite buffer:
download a subset of messages from the buffer, the subset of messages comprising messages which have not exceeded a defined expiry time for the message and which belong to an information channel to which the mobile computing device has subscribed and the subset comprising at least one real message comprising a data payload and at least one virtual message comprising metadata and no data payload; and
observing a message in a last-dropped state at the mobile device operating as a relay;
for each downloaded or observed message, maintaining details of unique paths from a source of the message to the mobile computing device via a single mobile device acting as a relay; and
providing feedback to mobile devices operating as relays relating to the unique paths.

* * * * *